United States Patent Office 2,892,820
Patented June 30, 1959

2,892,820
OIL SOLUBLE POLYMERS CONTAINING POLY-ALKYLENE GLYCOL SIDE-CHAINS

William T. Stewart, El Cerrito, Frank A. Stuart, Orinda, and Warren Lowe and Frank W. Kavanagh, Berkeley, Calif., assignors to California Research Corporation, San Francisco, Calif., a corporation of Delaware No Drawing. Application March 29, 1956
Serial No. 574,636

16 Claims. (Cl. 260—80.5)

This invention relates to the provision of a novel polymer composition, and it is particularly directed to the provision of copolymers of relatively high molecular weight which are soluble in mineral oil and other hydrocarbons and have good detergent and peptizing qualities among other desirable characteristics.

This application is a continuation-in-part of Lowe, Stewart, Stuart and Kavanagh, patent application Serial No. 400,758, filed December 28, 1953, and now abandoned, and Stewart, Stuart, Lowe and Kavanagh, patent application Serial No. 400,759, filed December 28, 1953, and now abandoned, both of which are continuation-in-part applications of Stuart, Stewart and Lowe patent application Serial No. 340,378 filed March 4, 1953, and now abandoned.

The polymeric additives of the present invention are copolymers of monomers selected from at least each of the first two classes of the classes consisting of (A) oil-solubilizing compounds having a polymerizable ethylenic linkage and containing a hydrocarbyl group of from 4 to 30 aliphatic carbon atoms, (B) esters of $\alpha,\beta$-unsaturated monocarboxylic acids of from 3 to 15 carbon atoms each wherein the carboxyl groups of said acids are monoester-linked to a member of the group consisting of polyalkylene glycols having from 2 to 7 carbon atoms in each alkylene group and alkyl ethers thereof and (C) acidic compounds selected from the group consisting of $\alpha,\beta$-unsaturated monocarboxylic acids of from 3 to 15 carbon atoms each, $\alpha,\beta$-unsaturated, $\alpha,\beta$-dicarboxylic acids of from 4 to 12 carbon atoms each, anhydrides thereof and half-esters thereof, the alcohol portion of the ester group being as defined in (B) or hydrocarbons containing from 4 to 30 aliphatic carbon atoms. Representative copolymers coming within the scope of the present invention are, for example, dodecyl methacrylate, nonaethylene glycol methacrylate and methacrylic acid; octadecene, di-2-ethylhexyl fumarate, tridecylether of decaethylene glycol methacrylate and crotonic acid; tridecyl methacrylate, octadecyl methacrylate and dodecylether of decaethylene glycol methacrylate; and vinyl stearate, allyl ethylether, dodecylether of decaethylene glycol crotonate and itaconic acid.

The oil-solubilizing monomer portion of the polymeric additives of this invention can be any compound having at least one ethylenic linkage

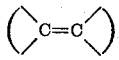

together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil-solubilizing monomers of this general character are well known in the art and are frequently employed as the oil-solubilizing portion of copolymers which are added to oils to improve the characteristics thereof. They include such materials as olefins and ethylenically unsaturated ethers, esters, ketones, aldehydes, and the like.

The oil-solubilizing monomers of component (A) may also be illustrated by the following general formula:

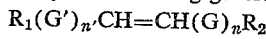

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

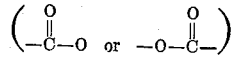

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following:

OLEFINS

| | |
|---|---|
| Hexene-1 | Octadecene-1 |
| 2-ethylhexene-1 | 4-octylcyclohexene-1 |
| Di- and triisobutylene | 3-phenylhexadecene-1 |
| Tripropylene | p-Octylstyrene |
| Dodecene-1 | Vinylcyclohexane |
| Hexadecene-1 | 2-hexadecylbutadiene-1,3 |
| Cyclohexene | p-Tertiarybutylstyrene |

ETHERS

| | |
|---|---|
| Vinyl n-butyl ether | Propenyl 2-ethylhexyl ether |
| Vinyl 2-ethylhexyl ether | Crotyl n-octyl ether |
| Allyl n-butyl ether | Isopropenyl dodecyl ether |
| Allyl isobutyl ether | 1-decenyl butyl ether |
| Allyl cyclohexyl ether | 1-eicosenyl decyl ether |
| Allyl 4,4,8,8-tetramethyl-docosyl ether | Vinyl p-octylphenyl ether |
| Methallyl n-hexyl ether | Methallyl p-tert. butylphenyl ether |
| Methallyl n-decyl ether | 1-decenyl p-cetylphenyl ether |
| Methallyl 2-ethylhexyl ether | 1-decenyl 2-phenylbutyl ether |
| Methallyl octadecyl ether | |

ESTERS

| | |
|---|---|
| Vinyl caproate | Cyclohexyl methacrylate |
| Vinyl palmitate | Cyclohexyl 2-dodecenoate |
| Vinyl oleate | Decyl vinylacetate |
| Allyl caprylate | Isooctyl α-chloroacrylate |
| Allyl laurate | p-Isoamylphenyl 2-hexadecenoate |
| Allyl oleate | 4-p-tolylbutyl 2-octadecenoate |
| Allyl palmitate | Undecyl cinnamate |
| Allyl stearate | Methylcyclohexyl 2-ethyl-2-hexanoate |
| Allyl-2-ethylhexanoate | |
| Allyl ricinoleate | 5-ethyldocosyl crotonate |
| Allyl esters of babassu acids | Octadecyl isocrotonate |
| Allyl esters of lard acids | n-Butyl 2-eicosenoate |
| Allyl naphthenate | p-Tert. amylphenyl octadecyl maleate |
| Methallyl caproate | |
| Methallyl naphthenate | p-Hexadecylphenyl 2-ethylhexyl maleate |
| Methallyl ricinoleate | |
| Methallyl p-octylbenzoate | o-Tolyl 2-octadecylcyclohexyl maleate |
| Methallyl oleate | |
| Methallyl cyclohexane carboxylate | o-Nonylphenyl-hexadecyl maleate |
| Methallyl palmitate | Dihexadecyl maleate |
| Crotyl oleate | Di-methylcyclohexyl maleate |
| Crotyl naphthenate | Mono-2-ethylhexyl maleate |
| α-Methylcrotyl palmitate | Di-2-ethylhexyl maleate |
| 1-propenyl naphthenate | Di-dodecyl maleate |
| 1-propenyl elaidate | Di-dodecyl mesaconate |
| Dodecyl acrylate | Di-dodecyl citraconate |
| Hexadecyl methacrylate | o-Tolyl octadecyl itaconate |
| Isobutyl α-decylacrylate | Mono-hexadecyl itaconate |
| Vinyl p-n-octyl benzoate | Isopropenyl palmitoleate |
| Allyl 3,5-diisobutyl benzoate | 1-decenyl laurate |
| | 1-hexadecenyl myristate |

Although any of the oil-solubilizing compounds described above will give effective copolymer compositions for lubricant compositions in accordance with the present invention, higher alkyl esters of α,β-unsaturated monocarboxylic acids of from 3 to 8 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids containing from 10 to 20 carbon atoms in the alkyl groups, since they are found to provide highly superior polymers according to the invention and are obtainable in commercial quantities.

The α,β-unsaturated monocarboxylic acid components of the copolymeric additives of this invention have the general formula

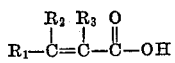

where the $R_1$'s, $R_2$'s and $R_3$'s, which can be the same as or different from one another, are selected from the group consisting of hydrogen atoms and alkyl groups of from 1 to 4 carbon atoms. Representative acids of this type, any one or more of which can be employed in forming the copolymers hereof, are acrylic, methacrylic, crotonic, tiglic, angelic, α-ethylacrylic, α-methylcrotonic, α-ethylcrotonic, β-ethylcrontonic, α-butylcrotonic, hydrosorbic, α-propylhydrosorbic acids, and the like. A more preferred group of acids for use in the present invention comprises those of the type indicated by the above structural formula which contain a total of from about 3 to 8 carbon atoms in the molecule, as represented by all except the last-named of the acids listed above. A still more preferred group of acids is made up of acrylic and methacrylic acids.

The α,β-unsaturated, α,β-dicarboxylic acid components of the copolymeric additives have the structural formula

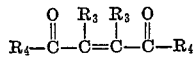

wherein the $R_3$'s, which may be the same as or different from one another, are hydrogen atoms or alkyl groups of from 1 to 4 carbon atoms each, and the $R_4$'s represent (1) a common —O— radical (in which case the compound is an acid anhydride), or (2) both $R_4$'s represent —OH radicals. Representative acids of this type, any one or more of which can be employed, include maleic, fumaric, itaconic, glutaconic, citraconic, mesaconic and aconitic acids, and the like. A preferred group of acids comprises those of the type illustrated by the above formula which contain a total of from about 4 to 8 carbon atoms in the molecule. Still more preferred are maleic acid and its anhydride.

The polyalkylene glycols and alkyl ethers thereof used in the esterification of the copolymeric (B) and (C) components of the copolymer additives of the invention contain from 2 to 7 carbon atoms in each alkylene group, as already mentioned. Poly-1,2-alkylene glycols and their alkyl ethers having molecular weights between 134 and 30,000 are preferred. Such glycols may be obtained by polymerizing 1,2-alkylene oxides or mixtures thereof in the presence of a catalyst and a suitable initiator for the reaction such as water, monohydric alcohol in the case of the allyl ethers, mercaptan and the like. The preparation of polyglycol compounds of this type has been fully described heretofore in U.S. Patents 2,448,664 and 2,457,139, for example, and, therefore, requires no detailed discussion here.

The polyglycol ester of the (B) component of the polymer can also be described as having the general structural formula,

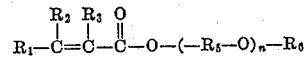

where $R_1$, $R_2$ and $R_3$, as indicated above in connection with the definition of the monocarboxylic acid component, are hydrogen atoms or $C_1$—$C_4$ alkyl radicals, the $R_5$'s are 1,2-alkylene radicals of 2 to 7 carbon atoms, $n$ is an integer greater than 1, and $R_6$ is a hydrogen atom or a substituted or unsubstituted hydrocarbon group, the substituent groups here contemplated being the polar groups

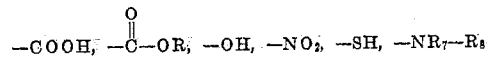

or

where the $R_7$'s and the $R_8$'s are hydrogen atoms or hydrocarbon groups. For present purposes, however, a more preferred group of (B) monomer components is made up of those compounds wherein, in the above structural formula, $R_1$ and $R_2$ represent hydrogen atoms, $R_3$ represents hydrogen or a methyl group, the $R_5$'s are ethylene or propylene groups, and $R_6$ is hydrogen or an alkyl group of from 1 to 18 carbon atoms.

For present purposes, the most suitable poly-1,2-alkylene glycols are those derived from ethylene oxide or from 1,2-propylene oxide or mixtures thereof and their alkyl ethers of 1 to 18 carbon atoms per alkyl group which have molecular weights or average molecular weights between about 200 and 2,000, or higher, preferably between about 400 and 10,000. Esterification with these polyalkylene glycols is found to provide the most effective detergent and dispersant compositions.

The following polyalkylene glycols containing from 2 to 7 carbon atoms in each alkylene group are illustrative of the types described above.

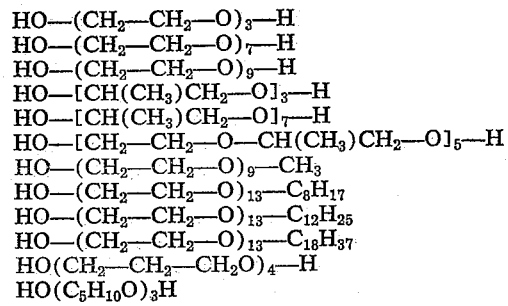

Polyethylene glycol mixtures having average molecular weights of 200, 400, 1000, 1540, 2000 or 10,000.
Poly-1,2-propylene glycol mixtures having average molecular weights of 425, 1025 or 10,000.

In preparing the copolymers of this invention, it is important to obtain a final product which is oil-soluble, i.e., which is soluble in the mineral oil or hydrocarbon to the extent of at least 0.0005% by weight. Since the various oil-solubilizing monomer components differ somewhat in their oil-solubilizing characteristics, preliminary tests are made with the polymeric additive to determine whether the relative proportion of soil-solubilizing monomer compound in the copolymer is high enough to impart the desired degree of oil-solubility. If the solubility in oil is unduly low, and if there remain uncombined carboxyl groups in the copolymer, the oil-solubility thereof can normally be remedied by esterifying a portion of said carboxyl groups with a higher alcohol, e.g., a $C_8$ or higher aliphatic alcohol such as n-octanol, 2-ethylhexanol, decanol, dodecanol (lauryl alcohol) or the like.

In general, however, satisfactory oil-solubility, dispersant and detergency properties are obtained with polymers wherein the (A), or oil-solubilizing component constitutes from about 75 to 97 mole percent or more, for example, 99.9 mole percent, of the over-all polymer composition, with the (B) and (C), or polar polyglycol ester and acid monomer components representing a total of from 25 to 3 mole percent or less, for example, 0.1 mole percent, of the polymer composition, there being in all cases at least one and usually several monomer units of said (B) polyglycol ester monomer components in the copolymer. Expressed percentagewise, of the total polar monomer content of the copolymer, the (B), or polyglycol ester component constitutes from 100 to 3 mole percent, while the (C), or acid component constitutes from 0 to 97 mole percent. By a careful program of exploratory research, supported by engine testing data, preferred ranges can be established within the aforesaid ranges for particular polymers and classes of polymers coming within the scope of this invention. Thus, with copolymers of (A) a higher alkyl methacrylate (e.g., lauryl methacrylate), (B) an acrylate or methacrylate of a polyethylene glycol or a polypropylene glycol, or a monoalkyl ether of said glycols, or mixture of said glycols or glycol ethers, or a polyglycol monoether, where the glycols are of the molecular weights previously specified for these compounds, and (C) acrylic or methacrylic acids, there preferably is employed from 80 to 99.9 mole percent of the oil-solubilizing (A) component. The balance or polar portion of the polymer, taken on the basis of 100 mole percent polar portion, is made up from 35 to 100 mole percent of the (B) component and 65 to 0 mole percent of the (C) component.

Although effective copolymers according to the invention are obtained with proportions of oil-solubilizing (A) monomer units and polar (B) and (C) monomer units within the aforementioned ranges, it has been noted that in the application of the copolymeric detergent additives of the present invention in mineral oil, a certain optimum relationship appears to exist between the total number of solubilizing aliphatic carbon atoms and the total number of polar groups within the molecule. This optimum relationship which is termed "Polar Balance" for convenience, is expressed by the formula $$PB = \frac{\Sigma(N_p \times P)}{N_s}$$

in which $PB$=polar balance, $N_p$=number of a certain polar group, $P$=polarity constant for the polar group, and $N_s$=number of solubilizing aliphatic carbon atoms.

The polarity constant for free carboxyl polar groups (—COOH) is 100. For hydroxyl polar groups, the polarity constant is 50. For alkylene oxide groups (—RO—, where R is an alkylene group, preferably ethylene or propylene), the polarity constant is 15. The solubilizing aliphatic carbon atoms to be considered are the following:

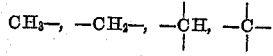

and excluding aromatic ring carbon atoms and the carbon atom of carbonyl groups.

The polar balance of a given copolymer according to the above formula is equal to the sum of the number of each type of polar group multiplied by its polarity constant, said sum being then divided by the number of solubilizing aliphatic carbon atoms. For best performance, the polar balance is approximately 1. However, very effective copolymeric detergent additives may have polar balances in the range from 0.30 to 3.00.

The copolymers employed in a practice of this invention can be prepared by any one of several methods, as known in the art. Thus, one may polymerize a mixture of the desired monomer components to form the desired polymer. The reaction is easier to control, however, by starting with suitable precursor compounds, with the desired monomer units then being formed by the appropriate treatment of the resulting polymeric intermediate product. Thus, one may first copolymerize a given oil-solubilizing compound such as an alkyl methacrylate with a suitable acid component such as methacrylic acid or maleic anhydride; the resulting polymer is then reacted with a polyalkylene glycol whereby a portion or all of the free —COOH groups in the polymer intermediate become monoester-linked to the polyalkylene glycol. Other possible variations in the nature of the reactants and in the selection of a suitable reaction path would also suggest themselves to those skilled in the art.

When the polymeric additive of this invention, or a suitable polymeric intermediate, is to be prepared by reaction of monomeric components, said polymers can be prepared by conventional bulk, solution or emulsion methods in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert. butyl hydroperoxide, di-tert. butyl peroxide, dibenzoyl peroxide, or di-tert. amyl peroxide, or an azo initiator such as 1,1'-azodicyclohexanecarbonitrile or α,α'-azodiisobuteronitrile. The catalyst, or polymerization initiator, can be employed in an amount of from about 0.1 to 10%, with a preferred range being from 0.10 to 2%. If desired, the catalyst can be added in increments as the reaction proceeds. Likewise, additional portions of the solvent can also be added from time to time in order to maintain the solution in a homogeneous condition. The temperature of copolymerization varies from about 170 to 300° F., with the optimum temperature for any given preparation depending on the nature of the solvent, the concentration of monomers present in the solvent, the catalyst, and the duration of the reaction. Much the same conditions are employed when the copolymerization is effected in bulk rather than in the presence of an inert solvent.

The copolymer additives of the invention have apparent molecular weights as determined by standard light scattering methods of at least 2,000 and preferably 8,000. For practical purposes, molecular weights of from 100,000 to 1,000,000 are most suitable from the standpoint of viscosity and other physical characteristics of the polymeric additives.

Typical methods for preparing the copolymers which can be employed with success as detergents and dispersants in various compositions are given in the following examples.

*Example I*

In this operation a homopolymer of dodecyl methacrylate (Acryloid 710, a product of Rohm & Haas Company) was employed as the starting material from which was prepared a copolymer intermediate of dodecyl methacrylate and methacrylic acid. The preparation was as follows: A solution of 14 grams of potassium hydroxide in 300 cc. of 2-ethylhexanol was prepared, and to this solution was added 800 cc. of a 40% solution in mineral oil of the methacrylate homopolymer, this amount of KOH constituting a slight excess over that theoretically required to effect the desired saponification of approximately 12% of the ester groups present in the polymer. The resulting solution was heated to 320° F. and maintained at this temperature, with stirring, for 10 hours. To this solution was then added 50 cc. of benzene along with a 50% excess of 6N HCl over the amount theoretically required to liberate the free carboxyl groups from the corresponding salt. The acidified solution was then refluxed for two hours, after which it was cooled, diluted with ethyl ether, and water washed (along with a small amount of ethyl alcohol to break the emulsion) until neutral to litmus. The ether and dodecyl alcohol present in the solution were then distilled off, leaving as the oil-soluble residue a copolymer of dodecyl methacrylate and methacrylic acid wherein said components were present in a monomer ratio of 7.5:1, respectively. 140 grams of the resulting polymer intermediate were then dissolved in 250 grams of xylene and 60 grams of benzene, and to the resulting solution was added 60 grams of a mixture of polyethylene glycol compounds consisting of major portions of nonaethylene glycol and having an average molecular weight of about 400, together with one-half gram of the esterification catalyst p-toluene sulfonic acid. This mixture was refluxed at 270° F. for 10 hours, after which a sufficient quantity of solvent was distilled off to raise the reflux temperature to 335° F., with the refluxing being continued for three hours at this temperature. The reaction mixture was then cooled and dissolved in an equal volume of benzene, from which solution the polymer was then precipitated out by the addition of five times the volume of a 4:1 acetone-methanol mixture. This polymer which incorporates dodecyl methacrylate, methacrylic acid and polyethylene glycol monomethacrylate monomer units in the approximate proportions of 7.5:0.85:0.15, respectively, is a viscous solid which is miscible with benzene, toluene, xylene and hydrocarbon mineral oils in substantially all proportions. It has an apparent molecular weight of about 20,000–40,000.

Example II 155 g. (0.5 mole) of vinyl stearate, 2.7 g. (0.021 mole) of itaconic acid, 14.8 g. (0.021 mole) of tridecyl-capped polyethylene glycol methacrylate (molecular weight 708), and 200 cc. of butanone were charged to a three-necked reaction flask fitted with a stirrer, thermometer, reflux condenser, and dropping funnel. The mixture was stirred and heated to reflux temperature, 188° F. A solution of 3.4 g. of benzoyl peroxide in 30 cc. of butanone was added during a period of 2 hours. No apparent thickening occurred during this time. On the removal of 180 cc. of solvent, polymerization proceeded. The temperature was raised to 220–225° F. and kept at this temperature for 2 hours. 1.7 g. of bulk catalyst was then added in small installments over a period of an hour. Additional thickening occurred on stirring the mixture at 220° F. for another 3 hours. 700 cc. of benzene was added to the mixture, and the polymer was precipitated with 5 volumes of methanol. The recovered product was taken up in mineral oil to give 144 g. of polymer as a 52% concentrate. Analyses of the concentrate indicated that the polymer contained vinyl stearate, itaconic acid, and tridecyl ether of decaethylene glycol methacrylate in a molar ratio of approximately 68:4:3.

Example III 75.5 g. (0.3 mole) of octadecene, 63 g. (0.3 mole) of di-2-ethylhxeyl fumarate, 8.2 g. (0.095 mole) of crotonic acid, and 16.3 g. (0.23 mole) of tridecyl-capped polyethylene glycol methacrylate (molecular weight 708) were charged to a polymerization reactor as described in the preceding example. The mixture was stirred and heated to 220–225° F. with stirring. Bulk benzoyl peroxide was added intermittently in 0.8 g. installments during the course of 7 hours. The mixture was then kept at 194° F. for a period of 88 hours. The product obtained above was stripped to 425° F. at 1 mm. mercury to remove unreacted crotonic acid, octadecene, and di-2-ethylhexyl fumarate. 136 g. of polymer was obtained which was shown by analysis to contain octadecene, di-2-ethylhexyl fumarate, crotonic acid, and tridecyl ether of decaethylene glycol methacrylate in a molar ratio of 10:15:3:1.

Example IV

A three-necked flask fitted with a stirrer, thermometer, reflux condenser, and dropping funnels was charged with 29.6 g. (0.35 mole) of hexene-1. The monomer was stirred and heated to reflux, 146° F. A monomer mixture comprised of 89 g. (0.35 mole) of lauryl methacrylate, 1.2 g. (0.140 mole) of methacrylic acid, and 61.2 g. (0.059 mole) of dedecyl-capped polyethylene glycol methacrylate (molecular weight 1034), in 30 cc. of benzene was added to the refluxing hexene simultaneously with the addition of a catalyst solution. After the addition of 100 cc. of the monomer mixture and approximately 0.45 g. of benzoyl peroxide in 5 cc. of benzene over a period of 2 hours, no polymerization was observed. During the course of addition, the temperature gradually rose, and after another two hours the maximum temperature reached was 187° F. Considerable thickening occurred during this time and it was necessary to add xylene diluent in small portions at intervals to facilitate stirring. The mixture was kept at 190° F. for another three hours. At this point 177 g. of mineral oil was added. The solvent and unreacted hexene, lauryl methacrylate and methacrylic acid were distilled from the mixture to give 140 g. of polymer as a 44% concentrate. The polymer was shown by analyses to contain hexene, lauryl methacrylate, methacrylic acid, and dodecyl-capped polyethylene glycol methacrylate in a molar ratio of 17:25:2:4.

Example V 1.9 kg. of phenol was mixed with 4 kg. of polyisobutylene having an average molecular weight of about 400. The polyisobutylene corresponded roughly to heptaisobutylene. To this mixture 90 g. of a boron trifluoride phenol complex was added to catalyze the alkylation. An additional 90 g. of catalyst was added after the reaction mix had stood at 60° C. for 4 hours. The heating was continued for another 3 hours and 2.5 liters of a 10% solution of potassium carbonate was then added to the mixture. This mixture was stirred for half an hour, after which the potassium carbonate solution was withdrawn and the alkylated phenol was washed with hot water until the water washes were neutral. The mixture was then stripped of water and other volatile material by heating to 320° F. under a vacuum of 3 mm. of mercury. The yield of washed product was 4215 grams and the equivalent weight was 620.

4100 g. of the alkyl phenol obtained above was mixed with 21 g. of sodium hydroxide and the mixture added to a bomb which was heated to 100° C. 415 g. of ethylene oxide was charged to the bomb. This addition of ethylene oxide was carried out over a period of 1½ hours in order to maintain the temperature of the exothermic reaction below 125° C. After charging all of the ethylene oxide, the bomb was rocked to insure mixing of the reactants for 4 hours. The product from the bomb was neutralized with glacial acetic acid and washed, yielding 4467 g. of alkylated phenoxyethanol having an equivalent weight of 736 as determined by hydroxyl number value.

The alkyl phenoxyethanol was converted to methacrylate ester by reaction with methacylic acid. 400 g. of the alkylphenoxyethanol, 215 g. methacrylic acid, 400 cc. of benzene, 5 g. of hydroquinone and 3 cc. of sulfuric acid were mixed and heated under reflux at about 200° F. for about 20 hours. The theoretical amount of water was evolved. The contents of the vessel were filtered and stripped at 400° F. under 6 mm. of mercury pressure. The stripped product was washed with sodium hydroxide and then with water until the water was neutral. It was then reheated to 220° F. under a pressure of 6 mm. of mercury to remove final traces of water. The yield was about 400 g.

100 g. of the alkylphenoxyethyl methacrylate obtained above, 5½ g. of methacrylic acid, 30 g. of dodecyl ether of decaethylene glycol methacrylate and 1.4 g. of benzoyl peroxide were charged to a flask and blanketed with an inert atmosphere of nitrogen. Benzene was added to reduce the viscosity and the contents of the flask refluxed at about 197° F. for 3½ hours. Methanol was then added to the benzene solution to precipitate a viscous polymer product. The separated polymer was admixed with a mineral oil having a viscosity of 150 SSU at 130° F. The yield of polymer concentrate was 245 g. The polymer was a copolymer of heptaisobutyl-enephenoxyethyl methacrylate methacrylic acid-dodecyl ether of decaethylene glycol methacrylate with a ratio of 20:7:5.

Other copolymers illustrative of the compositions of the invention were prepared according to the procedures outlined in the above examples. These copolymers are referred to in the tables which follow where they are described with respect to the particular monomers and mole ratios employed.

The efficacy of copolymeric additives of the type described above as detergents and dispersants in oils is illustrated by data from a number of tests. In the tests from which the data is obtained, the base oil, unless otherwise specified, is a solvent-refined, wax-free SAE-30 grade mineral oil which is derived from California waxy crude. Various amounts of the copolymeric additives are incorporated into the oil as noted in terms of percent by weight.

In the Lacquer Deposition Test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the lacquer deposition test involves condensing fresh cool flame oxidation products from a standard test fuel simulating the fuel combustion products of an internal combustion engine in a steel vessel containing a certain amount of the oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacquer deposits are de-oiled and weighed.

In the actual test a low grade gasoline is employed of the type described in connection with the standard FL-2 test procedure given below. The gasoline at a rate of 13.3 cc. per hour is vaporized and mixed with air, the air rate being 1.75 liters per minute. The vapor mixture of gasoline and air is then fed into an elongated cool flame combustion chamber of standard design having a diameter of 1½ inches. The cool flame combustion chamber is maintained at 695° F. The test is continued for 1 hour during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in weight of the steel vessel due to the lacquer deposits is then determined and recorded in milligrams as "LD" or "lacquer deposit."

The lacquer deposit for any given composition obtained in accordance with the procedure described above is directly correlated to the "piston varnish rating" or "PVR" obtained for the same composition in the standard FL-2 test procedure previously referred to and hereinafter more particularly described. Table I which follows gives the correlated values for both the lacquer deposits and piston varnish ratings.

TABLE I

| LD | PVR | LD | PVR |
|---|---|---|---|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the lacquer deposits determined for a given oil the piston varnish rating to be obtained in the standard FL-2 Chevrolet engine test.

In the test where the piston varnish ratings are obtained, a given oil composition is tested as the crankcase lubricant in a 6-cylinder Chevrolet engine using a low grade gasoline especially prone to cause engine deposits, the conditions being those defined in the standard FL-2 test procedure as described in the June 21, 1948 report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 4.5 is indicative of satisfactory performance, though preferably this rating should be 5 or above. In the case of the base oil alone without the addition of any additives it is found that the piston varnish rating is approximately 3.0. On the other hand, as indicated by the data presented in Table II below, when the base oil is compounded with the indicated amounts of a copolymer, greatly superior results are obtained.

TABLE II

| Composition | Ratio of (1) monomer to (2) monomer to (3) monomer, etc. | Piston varnish rating |
|---|---|---|
| Base oil alone | | 3.0 |
| 1.5% copolymer of (1) dodecyl methacrylate, (2) methacrylic acid and (3) nonaethylene glycol methacrylate in base oil | 23/3/1 | 4.7 |
| Do | 31/4/1 | 5.3 |
| Do | 33/5/1 | 6.7 |
| Do | 39/6/1 | 8.3 |
| Do | 48/6/1 | 5.0 |
| Do | 50/8/1 | 4.3 |
| Do | 75/10/1 | 4.3 |
| Do | 223/32/1 | 4.3 |
| 1.5% copolymer of (1) dodecyl methacrylate, (2) methacrylic acid and (3) dodecylether of decaethylene glycol methacrylate in base oil | 43/5/1 | 5.8 |
| Do | 75/10/1 | 7.7 |
| 1.5% copolymer of (1) dodecyl methacrylate, (2) methacrylic acid and (3) dodecylether of nonaethylene glycol methacrylate in base oil | 16/2/1 | 5.1 |
| Do | 21/3/1 | 6.5 |
| Do | 29/5/1 | 4.9 |
| Do | 37/6/1 | 5.3 |
| 1.5% copolymer of (1) dodecyl methacrylate, (2) methacrylic acid and (3) octadecylether of eicosaethylene glycol methacrylate in base oil | 18/2/1 | 4.2 |

TABLE II—Continued

| Composition | Ratio of (1) monomer to (2) monomer to (3) monomer, etc. | Piston varnish rating |
|---|---|---|
| 1.5% copolymer of (1) dodecyl acrylate, (2) acrylic acid and (3) dodecylether of decaethylene glycol acrylate in base oil | 70/8/1 | 5.1 |
| 1.5% copolymer of (1) tridecyl methacrylate, (2) octadecyl methacrylate, (3) methacrylic acid and (4) dodecylether of decaethylene glycol methacrylate in base oil | 10/7/1–1/2/1 | 5.4 |
| Do | 14/9/2–1/2/1 | 6.5 |
| Do | 14/10/2/1 | 6.6 |
| Do | 15/15/4/1 | 6.2 |
| Do | 18/12/4/1 | 4.7 |
| Do | 20/14/4/1 | 4.3 |
| Do | 16/11/1/2 | 4.6 |
| 1.5% copolymer of (1) tridecyl methacrylate, (2) octadecyl methacrylate, (3) methacrylic acid and (4) tridecylether of decaethylene glycol methacrylate in base oil | 11/7/1–1/2/1 | 4.8 |
| Do | 12/8/2/1 | 6.0 |
| Do | 16/16/4/1 | 4.4 |
| 1.5% copolymer of (1) tridecyl methacrylate, (2) octadecyl methacrylate, (3) methacrylic acid and (4) octadecylether of eicosaethylene glycol methacrylate in base oil | 14/9/2/1 | 7.6 |
| 1.6% copolymer of (1) tridecyl methacrylate, (2) octadecyl methacrylate and (3) dodecylether of decaethylene glycol methacrylate in base oil | 7/4/1 | 5.0 |
| 1.5% copolymer of (1) heptaisobutylene phenoxyethyl methacrylate, (2) methacrylic acid and (3) dodecylether decaethylene glycol methacrylate in base oil | 10/3/2 | 6.5 |
| Do | 20/7/5 | 4.5 |
| Do | 10/4/2 | 5.8 |
| 1.5% copolymer of (1) dodecyl methacrylate, (2) methacrylic acid and (3) methoxy (mixed polyethylene glycol-polypropylene glycol in approx. 1:1 mole ratio having an av. mol. wt. of approx. 400) methacrylate in base oil | 17/2/1 | 5.1 |
| 1.6% copolymer of (1) dodecyl methacrylate, (2) methacrylic acid and (3) butylether of decaethylene glycol methacrylate in base oil | 63/4/1 | 5.4 |
| 1.5% copolymer of (1) dodecyl methacrylate, (2) methacrylic acid and (3) octapropylene glycol methacrylate in base oil | 42/7/1 | 4.2 |
| 1.5% copolymer of (1) dodecyl methacrylate, (2) methacrylic acid and (3) pentaethylene glycol methacrylate in base oil | 55/10/1 | 5.0 |
| Do | 38/6/1 | 4.8 |
| 1.5% copolymer of (1) dodecyl methacrylate, (2) methacrylic acid and (3) dodecylthiounodecaethylene glycol methacrylate in base oil | 50/6/1 | 3.7 |
| 1.5% copolymer of (1) dodecyl methacrylate, (2) methacrylic acid and (3) decylthiononaethylene glycol methacrylate in base oil | 35/4/1 | 4.2 |
| 1.5% copolymer of (1) lauryl methacrylate, (2) methacrylic acid and (3) methacrylate of lauryl monoether of polyethylene glycol (av. mol. wt. 440) in base oil | 7.5/0.85/0.15 | 6.8 |
| Do | 7.5/0.74/0.26 | 8.5 |
| Do | 7.5/0.65/0.35 | 6.6 |
| 1.5% copolymer of (1) lauryl methacrylate, (2) methacrylic acid and (3) methacrylate of octadecyl monoether of polyethylene glycol (av. mol. wt. 440) in base oil | 7.5/0.8/0.2 | 9.3 |
| 1.5% copolymer of (1) lauryl methacrylate, (2) methacrylic acid and (3) methacrylate of of lauryl monoether of polyethylene glycol (av. mol. wt. 704) in base oil | 7.5/0.69/0.31 | 8.8 |
| 1.5% copolymer of (1) lauryl methacrylate, (2) methacrylic acid and (3) methacrylate of methyl monoether of polyethylene glycol (av. mol. wt. 750) in base oil | 7.5/0.82/0.18 | 7.8 |
| 1.5% copolymer of (1) lauryl methacrylate, (2) methacrylic acid and (3) methacrylate of methyl monoether of polyethylene glycol (av. mol. wt. 400) in base oil | 7.5/0.62/0.38 | 7.2 |
| 1.5% copolymer of (1) lauryl methacrylate, (2) methacrylic acid and (3) methacrylate of lauryl monoether of polyethylene glycol (av. mol. wt. 440) in base oil | 5.5/0.8/0.2 | 7.5 |
| 1.5% copolymer of (1) lauryl methacrylate, (2) methacrylic acid and (3) methacrylate of polypropylene glycol (av. mol. wt. 425) in base oil | 7.5/0.7/0.3 | 6.9 |
| 1.5% copolymer of (1) lauryl methacrylate, (2) acrylic acid and (3) methacrylate of lauryl monoether of polyethylene glycol (av. mol. wt. 440) in base oil | 7.5/0.8/0.2 | 8.6 |
| 1.5% copolymer of (1) tridecyl methacrylate, (2) methacrylic acid and (3) methacrylate of tridecyl monoether of polyethylene glycol (av. mol. wt. 440) in base oil | 7.5/0.9/0.1 | 6.3 |
| 1.5% copolymer of (1) (alkylphenoxy)[1] ethyl methacrylate, (2) methacrylic acid and (3) methacrylate of lauryl monoether of polyethylene glycol (av. mol. wt. 440) in base oil | 8/0.8/0.2 | 7.8 |
| 1.5% copolymer of (1) dodecyl methacrylate, (2) methacrylic acid and (3) nonaethylene glycol monomethacrylate in base oil | 7.5/0.85/0.15 | 7.5 |

[1] Prepared by alkylating phenol with polybutylene (av. $C_{14}$ per molecule) over $BF_3$ catalyst.

The data presented in Table III which follows illustrates the effectiveness of the copolymers of the invention as detergents and dispersants in base oils as determined by the Lacquer Deposition Test.

TABLE III

| Composition | Ratio of (1) monomer to (2) monomer to (3) monomer, etc. | Lacquer deposit (milligrams) | Piston varnish rating (estimated from lacquer deposit) |
|---|---|---|---|
| Base oil alone | | 850 | 3.0 |
| 2.8% copolymer of (1) vinyl stearate, (2) itaconic acid and (3) tridecylether of decaethylene glycol methacrylate in base oil | 68/4/3 | 505 | 4.4 |
| 2.8% copolymer of (1) octadecene, (2) di-2-ethylhexyl fumarate, (3) crotonic acid and (4) tridecyl ether of decaethylene glycol methacrylate in base oil | 10/15/3/1 | 617 | 3.9 |
| 2.8% copolymer of (1) hexene, (2) dodecyl methacrylate, (3) methacrylic acid and (4) dodecylether of octadecaethylene glycol methacrylate in base oil | 17/25/2/4 | 495 | 4.4 |
| 2.8% copolymer of (1) vinyl stearate, (2) allyl ethylether, (3) itaconic acid and (4) dodecylether of decaethylene glycol crotonate in base oil | 17/5/2/1 | 515 | 4.3 |

As indicated in the foregoing examples, the copolymers of this invention possess a relatively high molecular weight and are normally of a solid or semi-solid (gel-like) character. They are soluble in a wide variety of hydrocarbon liquids including benzene, toluene, xylene, petroleum ether and the various petroleum fractions including gasoline, kerosene, jet fuels, furnace oils, bunker oils, and oils of lubricating viscosity such as those employed as crankcase lubricants in internal combustion engines. They are soluble with difficulty in lower molecular weight paraffinic hydrocarbons such as pentane, hexane and the like. They are substantially insoluble in oxygenated solvents such as acetone and the various alcohols. The present copolymers have good detergent, emulsifying and peptizing qualities and are adapted to be used in a wide variety of applications where such qualities are desired. Thus, when added in small amounts (e.g., 0.5–10%) to lubricating oils, they impart improved detergency and anti-wear characteristics to the resulting lubricant composition. Again, when added to jet fuels, furnace oils and the like they act to prevent the various gums and other solid particles which form in said liquids from depositing out on the filters or in the heat exchangers through which many of said liquids are passed, such action apparently being attributable to a species of peptizing or other solubilizing action.

We claim:

1. An oil-soluble copolymer of monomers selected from at least each of the first two classes of the classes consisting of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (B) at least one ester of $\alpha,\beta$-ethylenically unsaturated monocarboxylic acids of from 3 to 15 carbon atoms each wherein the carboxyl groups of said acids are mono-ester-linked to a member of the group consisting of poly-1,2-alkylene glycols having a molecular weight between about 134 and 30,000 and from 2 to 7 carbon atoms in each alkylene group and alkyl ethers thereof, and (C) acidic compounds selected from the group consisting of $\alpha,\beta$-ethylenically unsaturated monocarboxylic acids of from 3 to 15 carbon atoms each, $\alpha,\beta$-ethylenically unsaturated, $\alpha,\beta$-dicarboxylic acids of from 4 to 12 carbon atoms each, anhydrides and monoesters of said dicarboxylic acids, the alcohol moiety of the ester group being selected from the group consisting of polyalkylene glycols and ethers thereof as defined in (B) and aliphatic hydrocarbon containing from 8 to 30 carbon atoms, said (A) component constituting from about 75 to 99.9 mole percent and said (B) and (C) components constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

2. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (B) at least one ester of α,β-ethylenically unsaturated monocarboxylic acids of from 3 to 15 carbon atoms each, wherein the carboxyl groups of said acids are monoester-linked to a member of the group consisting of poly-1,2-alkylene glycols having a molecular weight between about 134 and 30,000 and from 2 to 7 carbon atoms in each alkylene group and alkyl ethers thereof, and (C) acidic compounds selected from the group consisting of α,β-ethylenically unsaturated monocarboxylic acids of from 3 to 15 carbon atoms each, α,β-ethylenically unsaturated, α,β-dicarboxylic acids of from 4 to 12 carbon atoms each, anhydrides and monoesters of said dicarboxylic acids, the alcohol moiety of the ester group being selected from the group consisting of polyalkylene glycols and ethers thereof as defined in (B) and aliphatic hydrocarbon containing from 8 to 30 carbon atoms, said (A) component constituting from about 75 to 99.9 mole percent and said (B) and (C) components constituting a total of from about 25 to 0.1 mole percent of the polymer composition, there being present at least one monomer of said (B) component, and said (C) component, said copolymer having an apparent molecular weight of at least 2,000, as determined by the light scattering method and a solubility in lubricating oil of at least 0.0005% by weight.

3. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (B) at least one ester of α,β-ethylenically unsaturated monocarboxylic acids of from 3 to 15 carbon atoms each, wherein the carboxyl groups of said acids are monoester-linked to a member of the group consisting of poly-1,2-alklene glycols having a molecular weight between about 134 and 30,000 and from 2 to 7 carbon atoms in each alkylene group and alkyl ethers thereof, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

4. An oil-soluble copolymer of (A) at least one alkyl ester of an α,β-ethylenically unsaturated monocarboxylic acid of from 3 to 8 carbon atoms, said alkyl group having from 8 to 30 carbon atoms, (B) at least one ester of α,β-ethylenically unsaturated monocarboxylic acids of from 3 to 15 carbon atoms each, wherein the carboxyl groups of said acids are monoester-linked to a member of the group consisting of poly-1,2-alkylene glycols having a molecular weight between about 134 and 30,000 and from 2 to 7 carbon atoms in each alkylene group and alkyl ethers thereof, and (C) acidic compounds selected from the group consisting of α,β-ethylenically unsaturated monocarboxylic acids of from 3 to 15 carbon atoms each, α,β-ethylenically unsaturated, α,β-dicarboxylic acids of from 4 to 12 carbon atoms each, anhydrides and monoesters of said dicarboxylic acids, the alcohol moiety of the ester group being selected from the group consisting of polyalkylene glycols and ethers thereof as defined in (B) and aliphatic hydrocarbon containing from 8 to 30 carbon atoms, said (A) component constituting from about 75 to 99.9 mole percent and said (B) and (C) components constituting a total of from about 25 to 0.1 mole percent of the polymer composition, there being present at least one monomer of said (B) component, and said (C) component, said copolymer having an apparent molecular weight of at least 2,000, as determined by the light scattering method and a solubility in lubricating oil of at least 0.0005% by weight.

5. An oil-soluble copolymer of (A) at least one alkyl ether of an α,β-ethylenically unsaturated monocarboxylic acid of from 3 to 8 carbon atoms, said alkyl group having from 8 to 30 carbon atoms and (B) at least one ester of α,β-ethylenically unsaturated monocarboxylic acids of from 3 to 15 carbon atoms each, wherein the carboxyl groups of said acids are monoester-linked to a member of the group consisting of poly-1,2-alkylene glycols having a molecular weight between about 134 and 30,000 and from 2 to 7 carbon atoms in each alkylene group and alkyl ethers thereof, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

6. An oil-soluble copolymer of (A) dodecyl methacrylate, (B) at least one monomethacrylate of the dodecyl monoether of a polyethylene glycol having an average molecular weight between about 400 and 10,000 and (C) methacrylic acid, said (A) component constituting from about 75 to 99.9 mole percent and said (B) and (C) components constituting a total of from about 25 to 0.1 mole percent of the polymer composition, there being present at least one monomer each of said (B) and (C) components, said copolymer having an apparent molecular weight of at least 2,000, as determined by the light scattering method and a solubility in lubricating oil of at least 0.0005% by weight.

7. An oil-soluble copolymer of (A) dodecyl methacrylate, (B) at least one monomethacrylate of the octadecyl monoether of a polyethylene glycol having an average molecular weight between about 400 and 10,000 and (C) methacrylic acid, said (A) component constituting from about 75 to 99.9 mole percent and said (B) and (C) components constituting a total of from about 25 to 0.1 mole percent of the polymer composition, there being present at least one monomer each of said (B) and (C) components, said copolymer having an apparent molecular weight of at least 2,000, as determined by the light scattering method and a solubility in lubricating oil of at least 0.0005% by weight.

8. An oil-soluble copolymer of (A) dodecyl methacrylate, (B) at least one monomethacrylate of a polyethylene glycol having an average molecular weight between about 400 and 10,000 and (C) methacrylic acid, said (A) component constituting from about 75 to 99.9 mole percent and said (B) and (C) components constituting a total of from about 25 to 0.1 mole percent of the polymer composition, there being present at least said copolymer having an apparent molecular weight of at least 2,000, as determined by the light scattering method and a solubility in lubricating oil of at least 0.0005% by weight.

9. An oil-soluble copolymer of (A) tridecyl methacrylate, (B) at least one monomethacrylate of the tridecyl monoether of a polyethylene glycol having an average molecular weight between about 400 and 10,000 and (C) methacrylic acid, said (A) component constituting from about 75 to 99.9 mole percent and said (B) and (C) components constituting a total of from about 25 to 0.1 mole percent of the polymer composition, there being present at least one monomer each of said (B) and (C) components, said copolymer having an apparent molecular weight of at least 2,000, as determined by the light scattering method and a solubility in lubricating oil of at least 0.0005% by weight.

10. An oil-soluble copolymer of (A) heptaisobutylenephenoxyethyl methacrylate, (B) at least one monomethacrylate of the dodecyl monoether of a polyethylene glycol having an average molecular weight between about 400 and 10,000 and (C) methacrylic acid, said (A) component constituting from about 75 to 99.9 mole percent and said (B) and (C) components constituting a total of from about 25 to 0.1 mole percent of the polymer composition, there being present at least one monomer each of said (B) and (C) components, said copolymer having an apparent molecular weight of at least 2,000, as determined by the light scattering method and a solubility in lubricating oil of at least 0.0005% by weight.

11. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (B) at least one ester of $\alpha,\beta$-ethylenically unsaturated monocarboxylic acids of from 3 to 15 carbon atoms each, wherein the carboxyl groups of said acids are monoester-linked to a member of the group consisting of polyethylene glycols having an average molecular weight between about 400 and 10,000 and alkyl ethers thereof containing from 1 to 18 carbon atoms in the alkyl group, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

12. An oil-soluble copolymer of (A) at least one alkyl ester of an $\alpha,\beta$-ethylenically unsaturated monocarboxylic acid of from 3 to 8 carbon atoms, said alkyl group having from 8 to 30 carbon atoms and (B) at least one ester of $\alpha,\beta$-ethylenically unsaturated monocarboxylic acids of from 3 to 15 carbon atoms each, wherein the carboxyl groups of said acids are monoester-linked to a member of the group consisting of polyethylene glycols having an average molecular weight between about 400 and 10,000 and alkyl ethers thereof containing from 1 to 18 carbon atoms in the alkyl group, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

13. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (B) at least one ester of $\alpha,\beta$-ethylenically unsaturated monocarboxylic acids of from 3 to 15 carbon atoms each, wherein the carboxyl groups of said acids are monoester-linked to a member of the group consisting of poly-1,2-propylene glycols having an average molecular weight between about 400 and 10,000 and alkyl ethers thereof containing from 1 to 18 carbon atoms in the alkyl group, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

14. An oil-soluble copolymer of (A) at least one alkyl ester of an $\alpha,\beta$-ethylenically unsaturated monocarboxylic acid of from 3 to 8 carbon atoms, said alkyl group having from 8 to 30 carbon atoms and (B) at least one ester of $\alpha,\beta$-ethylenically unsaturated monocarboxylic acids of from 3 to 15 carbon atoms each, wherein the carboxyl groups of said acids are monoester-linked to a member of the group consisting of poly-1,2-propylene glycols having an average molecular weight between about 400 and 10,000 and alkyl ethers thereof containing from 1 to 18 carbon atoms in the alkyl group, said (A) component constituting from about 75 to 99.9 mole percent and said (B) component constituting a total of from about 25 to 0.1 mole percent of the polymer composition, there being present at least one monomer of said (B) component, said copolymer having an apparent molecular weight of at least 2,000, as determined by the light scattering method and a solubility in lubricating oil of at least 0.0005% by weight.

15. An oil-soluble copolymer of (A) dodecyl methacrylate and (B) at least one monomethacrylate of the dodecyl monoether of a polyethylene glycol having an average molecular weight of between about 400 and 10,000, said (A) component constituting from about 75 to 99.9 mole percent and said (B) component constituting from about 25 to 0.1 mole percent of the polymer composition, there being present at least one monomer of (B) component, said copolymer having an apparent molecular weight of at least 2,000, as determined by the light scattering method and a solubility in lubricating oil of at least 0.0005% by weight.

16. An oil-soluble copolymer of (A) dodecyl methacrylate and (B) monomethacrylates of a mixture of polyethylene glycols having an average molecular weight of between about 400 and 10,000, said (A) component constituting from about 75 to 99.9 mole percent and said (B) component constituting from about 25 to 0.1 mole percent of the polymer composition, there being present at least one monomer of (B) component, said copolymer having an apparent molecular weight of at least 2,000, as determined by the light scattering method and a solubility in lubricating oil of at least 0.0005% by weight.

References Cited in the file of this patent

UNITED STATES PATENTS 2,458,888   Rehberg et al. _____ Jan. 11, 1949